United States Patent [19]

Yamanaka et al.

[11] Patent Number: 5,332,542
[45] Date of Patent: Jul. 26, 1994

[54] PROCESS FOR PRODUCING LABELED HOLLOW CONTAINER

[75] Inventors: Masaaki Yamanaka; Takashi Yamanobe, both of Ibaraki, Japan

[73] Assignee: Oji Yuka Goseishi Co., Ltd., Tokyo, Japan

[21] Appl. No.: 906,651

[22] Filed: Jun. 30, 1992

[30] Foreign Application Priority Data

Jul. 3, 1991 [JP] Japan .................................. 3-162940

[51] Int. Cl.$^5$ .......................................... B29C 49/20
[52] U.S. Cl. ................................ 264/509; 428/36.9; 428/204
[58] Field of Search ............... 264/509; 428/36.9, 204

[56] References Cited

U.S. PATENT DOCUMENTS

| | | |
|---|---|---|
| 4,426,422 | 1/1984 | Daniels . |
| 4,548,857 | 10/1985 | Galante . |
| 4,837,075 | 6/1989 | Dudley . |
| 4,986,866 | 1/1991 | Ohbe et al. . |
| 5,026,592 | 6/1991 | Janocha et al. ............ 428/204 |
| 5,075,152 | 12/1991 | Tsukuda et al. ............ 428/204 |
| 5,079,057 | 1/1992 | Heider .................... 428/36.5 |

FOREIGN PATENT DOCUMENTS

| | | |
|---|---|---|
| 0254365 | 1/1988 | European Pat. Off. . |
| 0254023 | 2/1988 | European Pat. Off. . |
| 0281701 | 9/1988 | European Pat. Off. . |
| 0369023 | 5/1990 | European Pat. Off. . |

*Primary Examiner*—Catherine Timm
*Attorney, Agent, or Firm*—Oblon, Spivak, McClelland, Maier & Neustadt

[57] ABSTRACT

A process for producing a labeled hollow container comprising inserting a label having a multi-layer structure into a hollow mold and blow molding a molten parison of thermoplastic resin C in the mold is disclosed, in which the label is composed of a base layer comprising thermoplastic resin A having on one side thereof a heat-sealable resin layer comprising a mixture of at least lower-melting thermoplastic resin B and higher-melting themoplastic resin B' both having a melting point at least 20° C. lower than that of the themoplastic resin A, the mixture of themoplastic resins B and B' satisfying relationships:

$$5 < T_{mc} - T_{mB'} < 80$$

$$15 < T_{mB'} - T_{mB} < 50$$

wherein $T_{mc}$ is a melting point of thermoplastic resin C constituting the parison; $T_{mB'}$ is a melting point of higher-melting thermoplastic resin B'; and $T_{mB}$ is a melting point of lower-melting thermoplastic resin B, and lower-melting thermoplastic resin B being present in a proportion of from 10 to 60% by weight based on the heat-sealable resin layer. The in-mold label suffers from no blister even when the molding cycle is shortened.

5 Claims, No Drawings

PROCESS FOR PRODUCING LABELED HOLLOW CONTAINER

FIELD OF THE INVENTION

This invention relates to a process for producing a hollow container with a molded-in label through a shortened molding cycle, comprising inserting a label into a hollow mold and blow molding a parison of a thermoplastic resin in the mold.

BACKGROUND OF THE INVENTION

In-mold decorating of resin containers with a label has conventionally been carried out by injection molding, blow molding, differential pressure forming, expansion molding, and the like with a label being previously inserted into a mold. Labels known for in-mold decorating include gravure-printed resin films, full color offset-printed synthetic paper (see, for example, JP-B-46-40794 (the term "JP-B" as used herein means an "examined published Japanese patent application"), JP-B-54-31030, and British Patent 1090059), and a gravure-printed aluminum foil supported by a polyethylene film.

As long as the label or blank is integrally molded with a molten thermoplastic resin under high pressure, as in injection molding (100 to 1000 kg/cm$^2$), the resulting labeled container has a satisfactory appearance. However, where molding is conducted under low pressure, as in differential pressure forming (2 to 7 kg/cm$^2$) or blow molding (1 to 10 kg/cm$^2$), air is not allowed to escape sufficiently from the space between the blank and the molten container, resulting in a poor appearance due to trapped air-pockets called blisters.

In an attempt to eliminate blisters in blow molding or differential pressure forming, use of multi-color printable synthetic paper having a multi-layer structure of stretched resin films as a label has been proposed as disclosed in U.S. Pat. No. 4,986,866 and EP-A-436044. The proposed synthetic paper label is obtained by preparing a multi-layer film composed of a biaxially stretched polypropylene base layer having on one side thereof a paper-like layer comprising a uniaxially stretched polypropylene film containing 8 to 65% by weight of an inorganic fine powder and on the other side thereof an adhesive layer comprising a heat-sealable resin film having a melting point of 85° to 135° C., embossing the heat-sealable resin film, and then stretching the multi-layer film having an embossed finish on the back side thereof at a temperature higher than the melting point of the heat-sealable resin and lower than the melting point of the inorganic fine powder-containing thermoplastic resin. The thus obtained label is fixed in a mold with the paper-like layer in contact with the inner wall of the mold, a molten polyethylene compound is then adhered onto the adhesive layer of the label under pressure or under reduced pressure, followed by cooling.

Since the label used comprises a propylene resin whose melting point is higher than that of polyethylene as a molding compound, the above-described process holds an advantage that the label hardly suffers from shrinkage marks despite being composed of stretched films.

In the production of hollow containers, improvement in productivity is generally achieved by increasing the mold cooling efficiency to shorten the molding cycle. Besides, molding is commonly carried out at a parison temperature set about 40° to 80° C. higher than the melting point of the molding resin, while varying depending on the shape or size of the container or the mode of molding (e.g., a rotary blow molding machine or a shuttle type blow molding machine). In these cases, it is likely that the heat-sealable resin film of the molded-in label will not have cooled sufficiently, so when the container is withdrawn from the mold its label is at a high temperature, resulting in frequent occurrences of blisters. If the resin of the heat-sealable film is kept at a temperature above its melting point at the time when the labeled container is taken out, the label fails to follow the after-mold shrinkage of the container and undergoes lifting from the container, which appears to be one of the great causes of blisters.

SUMMARY OF THE INVENTION

An object of the present invention is to provide a process for producing a hollow container with a molded-in label while achieving improved productivity through reduction of the molding cycle.

The inventors have conducted extensive investigations and, as a result, have found that the above object is accomplished by using a multi-layered label in which a heat-sealable layer comprises a mixture of at least two thermoplastic resins having different melting points, with a lower melting resin being present in a specific proportion. The present invention has been completed based on this finding.

The present invention provides a process for producing a labeled hollow container which comprises inserting a label having a multi-layer structure into a hollow mold and blow molding a molten parison of a thermoplastic resin (designated thermoplastic resin C) in the mold, in which said label is composed of a base layer comprising a thermoplastic resin (designated thermoplastic resin A) having on one side thereof a heat-sealable resin layer comprising a mixture of at least two thermoplastic resins (designated lower-melting thermoplastic resin B and higher-melting thermoplastic resin B') both having a melting point at least 20° C. lower than that of said thermoplastic resin A, said mixture of thermoplastic resins B and B' satisfying relationships:

$$5 < T_{mC} T_{mB'} < 80$$

$$15 < T_{mB'} - T_{mB} < 50$$

wherein $T_{mC}$ is a melting point of thermoplastic resin C constituting the parison; $T_{mB'}$ is a melting point of higher-melting thermoplastic resin B'; and $T_{mB}$ is a melting point of lower-melting thermoplastic resin B. The lower-melting thermoplastic resin B is present in a proportion of from 10 to 60% by weight based on said heat-sealable resin layer.

DETAILED DESCRIPTION OF THE INVENTION

The label which can be used in the present invention is essentially composed of a base layer and a heat-sealable resin layer provided on the back side of the base layer (i.e., the side to be adhered to a resin container).

The base layer includes a film of a thermoplastic resin having a melting point ranging from 127° to 264° C., e.g., polypropylene, high-density polyethylene, middle-density polyethylene, linear low-density polyethylene, polyvinyl chloride, polyesters (e.g., polyethylene terephthalate, polybutylene terephthalate), and polyamides, containing from 8 to 65% by weight of an inorganic fine powder and a film of such a thermoplastic resin having coated thereon an inorganic filler-containing latex or having thereon an aluminum deposit. The base layer may have a single layer structure or a multi-layer structure comprised of two or more layers. The base layer of the multi-layer structure can be obtained by co-extrusion or laminating.

A particularly preferred base layer is a stretched laminate film having microvoids composed of a biaxially stretched polypropylene film containing from 5 to 35% by weight of an inorganic fine powder having on one or both sides thereof a paper-like layer comprising a uniaxially stretched polypropylene film containing from 8 to 65% by weight of an inorganic powder. The stretched laminate film preferably has a void of from 10 to 50% as calculated according to formula:

$$\text{Void } (\%) = [(\rho_0 - \rho)/\rho_0] \times 100$$

wherein $\rho_0$ is the density of a film before stretching; and $\rho$ is the density of the film after stretching. With the void falling within a range of from 10 to 50%, the base layer of this type has an advantage of allowing use of the same polypropylene as used for the base layer as a resin used for the parison because the microvoids serve for heat insulation and thereby prevent the label from undergoing heat shrinkage during blow molding.

The heat-sealable layer on the back side of the base layer comprises a mixture of at least two themoplastic resins B and B' both having a melting point lower than that of resin A constituting the base layer by at least 20° C., preferably ranging from 78° to 180° C., in which the lower-melting thermoplastic resin B and higher-melting thermoplastic resin B' satisfy the following relationships:

$$5 < T_{mC} - T_{mB'} < 80, \text{ preferably}$$
$$30 < T_{mC} - T_{mB'} < 80,$$

$$15 < T_{mB'} - T_{mB} 50, \text{ preferably } 25 < T_{mB'} - T_{mB} < 40,$$

wherein $T_{mC}$, $T_{mB'}$, and $T_{mB}$ are as defined above, and said lower-melting thermoplastic resin is present in a proportion of from 10 to 60% by weight, and preferably from 15 to 55% by weight, based on the heat-sealable resin layer.

Essential requirements for the heat-sealable resin layer are that at least two heat-sealable resins which have different melting points should be used, and that the melting points of the higher-melting resin B' (i.e., $T_{mB'}$) and the lower-melting resin B (i.e., $T_{mB}$) should satisfy the above-mentioned relationships.

The term "melting point" as used herein for thermoplastic resins means a peak temperature of the differential thermal analysis (DTA) curve obtained by measurement on a sample weighing from 3 to 10 mg by means of a differential scanning calorimeter (DSC) at a rate of temperature rise of 5° C./min.

Examples of inorganic fine powders and fillers include calcium carbonate, talc, clay, titanium oxide, silica, mica, zinc white, satin white, and so on. Their diameters are from 0.05 to 15 μm.

The mechanism of action of the higher-melting heat-sealable resin in the present invention is explained below. When the blow molding cycle is shortened by reducing the mold cooling time for improving productivity, the hollow container is removed from the mold while still at a relatively high temperature. Such a situation is also encountered when using a mold having poor cooling efficiency or having a thick-walled container. When a molded container, particularly the labeled part thereof, has a high temperature at the time of removal from the mold, the higher-melting resin undergoes interlocking at a temperature higher than the interlocking temperature of the lower-melting resin. Accordingly, the label maintains an adhesive power sufficient for easily following after-shrinkage of the container thereby preventing blistering due to lifting of the label from the container.

On the other hand, the mechanism of action of the lower-melting resin is as follows. A molten parison is extruded from a die and held on a mold in which the label has been inserted with its heat-sealable resin layer facing the parison. Then, pressurized air of 2 to 8 kg/cm² is blown into the inside of the molten parison whereby the heat-sealable resin of the label is easily melted by the heat of the parison to achieve in-mold decorating. The existence of the lower-melting heat-sealable resin not only reduces the time required for melting but decreases the temperature of melting. Accordingly, even if the molding cycle is shortened, firm adhesion of the container and the label can be achieved easily.

For the lower-melting resin to produce such an effect, it should be present in a proportion of from 10 to 60% by weight based on the total heat-sealable resin. If the amount of the lower-melting resin is less than 10%, it is difficult to shorten the molding cycle while achieving firm adhesion of the label. If it exceeds 60%, shortening of the molding cycle tends to be attended by appreciable occurrence of blisters.

The above-described heat-sealable thermoplastic resins include ethylene resins, such as high-density polyethylene, middle-density polyethylene, low-density polyethylene, linear polyethylene, an ethylene-vinyl acetate copolymer, an ethylene-acrylic acid copolymer, an ethylene-$C_{1-8}$ alkyl acrylate copolymer, an ethylene-$C_{1-8}$ alkyl methacrylate copolymer, and a metal salt (e.g., Zn, Al, Li, K, Na) of an ethylene-methacrylic acid copolymer.

Where polypropylene or high-density polyethylene is used as parison-forming resin C, it is preferable to use, as a heat-sealable resin mixture, a mixture comprising from 10 to 55% by weight of a linear low-density polyethylene having a density of from 0.88 to 0.94 g/cm³ and a melt index (MI) of from 0.05 to 30 g/10 min and from 45 to 90% by weight of at least one resin selected from low-density polyethylene, an ethylene-methacrylic acid copolymer, an ethylene-acrylic acid copolymer, and an ethylene-vinyl acetate copolymer.

The heat-sealable resin layer may be a transparent film and may be either stretched or unstretched. It is recommended to use a stretched but non-oriented film.

After embossing, the laminate film is stretched at least uniaxially at a stretch ratio usually of from 3.5 to 12, and preferably from 4 to 10. The stretching temperature is lower than the melting point of the base layer resin and higher than the melting point of the heat-sealable resin mixture. By the stretching, the base layer is orientated, while the heat-sealable resin layer is not orientated.

The label according to the present invention usually has a thickness of from 30 to 300 μm, and preferably from 45 to 200 μm, with the adhesive layer thereof comprising the heat-sealable resin mixture having a thickness usually of from 1 to 30 μm, and preferably from 2 to 20 μm.

If desired, the stretched laminate film may be subjected to a surface treatment, such as a corona discharge treatment, a flame treatment, and a plasma treatment, so as to have improved printability or improved adhesiveness.

Various sales messages, such as a trade name, a maker's name, a seller's name, a registered design, a bar code, usage, etc. can be printed on the surface side of the base layer, for example the paper-like layer, by gravure printing, offset printing, flexographic printing, screen printing, or similar printing techniques.

The printed and embossed label is cut into pieces of desired shape and size by punching. The label may be adhered to a part of the outer surface of a container, but is usually used as a blank surrounding the side wall of a cup container or a label adhered to the surface side and the back side of a bottle container produced by blow molding.

In the production of a labeled hollow container by integral molding, a label is first inserted into a mold with its adhesive layer facing inside the cavity, and a molten parison of a thermoplastic resin, e.g., polypropylene or high-density polyethylene, extruded from an extruder is introduced into the mold at a temperature of from 170° to 250° C. After one end of the parison is clamped, a compressed gas of from 0.5 to 10 kg/cm²G, preferably from 2 to 5 kg/cm²G, is introduced into the inside of the parison to expand the parison. The outer side of the parison is thereby pressed onto the inner wall of the mold to the shape of the mold. At the same time, the molten parison is adhered to the adhesive layer of the in-mold label to melt the resin of the adhesive layer of the label and to fusion bond the parison and the adhesive layer. After being cooled, the mold is opened, and the thus obtained labeled hollow container is taken out.

Thus, a labeled hollow container with a satisfactory appearance free from blisters can be produced through a short molding cycle at low cost. The thus obtained labeled hollow containers can be used as shampoo containers, edible oil bottles, motor oil containers, containers for bactericides for sanitary ware, a float of rice-planting machines, toys, molded articles such as surfing boards, and other various containers for daily uses.

The present invention is now illustrated in greater detail with reference to the following Examples, but it should be understood that the present invention is not construed as being limited thereto. In these examples, all the percents, parts, and ratios are by weight unless otherwise indicated.

In the Examples and Comparative Examples, evaluation of mold-in labels and measurement of melting points of resins were made as follows.

1) Evaluation of Label:
Blister:

A total area ratio of blisters in the label area was measured and marked according to the following rating system. The marks of five containers per each experiment were added up.

5 ... No blister was observed.
4 ... Less than 10%.
3 ... From 10% up to less than 20%.
2 ... From 20% up to less than 50%.
1 ... 50% or more.

Opacity:
Measured according to JIS P8138.

2) Measurement of Melting Point:
The fusion peak temperature as measured with a DSC was taken as a melting point.

EXAMPLE 1

Preparation of Laminate Sheet

Composition A comprising 85 parts of polypropylene ("MITSUBISHI POLYPROMA-6" produced by Mitsubishi Petrochemical Co., Ltd.; melting point: 164° C.) and 15 parts of natural ground calcium carbonate (particle size: 1.5 μm, hereinafter the same) was melt-kneaded in an extruder and extruded from a die at 250° C. to obtain a sheet. The sheet was cooled to about 50° C. The sheet was heated to about 153° C. and longitudinally stretched at a stretch ratio of 4 by making use of a peripheral speed difference between rolls to obtain uniaxially stretched film A.

Composition $B_2$ comprising 52 parts of polypropylene ("MITSUBISHI NOBLENMA-3", produced by Mitsubishi Petrochemical Co., Ltd.; melting point: 166° C.), 3 parts of high-density polyethylene having a density of 0.960 g/cm³ ("YUKARON HARD EY-40", produced by Mitsubishi Petrochemical Co., Ltd.; melting point: 134° C.), and 45 parts of natural ground calcium carbonate and composition $B_1$ comprising 47 parts of polypropylene "MA-3", 5 parts of maleic anhydride-grafted polypropylene (produced by Mitsubishi Petrochemical Co., Ltd.; maleic anhydride content: 0.5%; melting point: 164° C.), 3 parts of high-density polyethylene "EY-40", and 45 parts of natural ground calcium carbonate were separately melt-kneaded in the respective extruders, fed to the same die where they were laminated, and extruded at 250° C. on one side of stretched film A to obtain a 3-layered laminate film with layer $B_1$ as an external layer.

Separately, composition C comprising 52 parts of polypropylene "MA-3", 3 parts of high-density polyethylene "EY-40", and 45 parts of natural ground calcium carbonate and composition D comprising 30 parts of linear polyethylene ("MITSUBISHI POLYETHY LL UJ580", produced by Mitsubishi Petrochemical Co., Ltd.; melting point: 127° C.), 50 parts of low-density polyethylene ("MITSUBISHI POLYETHY LD LK-40", produced by Mitsubishi Petrochemical Co., Ltd.; melting point: 108° C.), and 20 parts of an ethylene-methyl acrylate copolymer (melting point: 86° C.) were separately melt-kneaded in the respective extruders, fed to the same die where they were laminated, and extruded at 250° C. on the other side of stretched film A to obtain a 5-layered laminate sheet with layer D as an external layer. At this time, the surface of layer D (heat-sealable resin layer) was embossed by means of a reverse gravure roll having 150 embossing lines.

The 5-layered sheet was once cooled to 60° C., again heated to about 163° C., and stretched in the transverse direction at a stretch ratio of 7 by means of a tenter. The stretched sheet was heat set by passing through an oven at 165° C. and cooled to about 60° C., followed by trimming to obtain a laminate sheet having a 5-layered structure composed of 5 μm thick layer $B_1$, 20 μm thick layer $B_2$, 40 μm thick layer A, 20 μm thick layer C, and 5 μm thick layer D (total thickness: 90 μm). The laminate sheet had a void of about 30%.

Preparation of Label

Layer $B_l$ of the laminate sheet was subjected to a corona discharge treatment, and an acrylic antistatic agent solution ("ST-1300", produced by Mitsubishi Petrochemical Co., Ltd.) was coated thereon and dried. The thus treated surface was offset printed in full color, and the sheet was cut to size of 50×50 mm to obtain labels.

Production of Labeled Hollow Container

The label was fixed to the inner wall of a mold by evacuation with its printed side (layer $B_1$) in contact with the wall. High-density polyethylene ("MITSUBISHI POLYETHY HD BZ-50", produced by Mitsubishi Petrochemical Co., Ltd.; melting point: 134° C.) was extruded at 200° C. in a parison. The parison was clamped by the mold to close one end thereof, and pressurized air of 5 kg/cm² was blown into the inside of the parison from the other end to conduct blow molding. After being cooled for 7, 9, 11, 13, or 15 seconds, the mold was opened, and a labeled bottle of 60 mm in body diameter, 200 mm in height, and 1 mm in wall thickness was removed therefrom.

The surface appearance (blister) of the label was evaluated according to the above-described standard, and the results obtained are shown in Table 1 below. Further, the surface temperature of the label on the bottle was measured immediately (2 to 3 seconds) after mold was opened. The results are shown in Table 2 below.

EXAMPLES 2 TO 8 AND COMPARATIVE surface temperature of the label immediately after opening the mold is shown in Table 2.

EXAMPLE 9

A labeled container was produced in the same manner as in Example 1, except for using a label prepared as follows.

High-density polyethylene ("MITSUBISHI POLYETHY HD LY-20", produced by Mitsubishi Petrochemical Co., Ltd.; melting point: 132° C.) was extruded at 230° C. in a sheet, followed by cooling with a cooling roll to about 50° C.

Composition D comprising 40 parts of low-density polyethylene "POLYETHY LD LK-40" (melting point: 108° C.), 40 parts of an ethylene-acrylic acid copolymer (melting point: 100° C.), and 20 parts of an ethylene-methyl acrylate copolymer (melting point: 86° C.) was melt-extruded in a separate extruder and laminated at 200° C. on one side of the above-obtained sheet. At the time of laminating, layer D was embossed by means of a gravure roll having 200 embossing lines. A double-layered laminate sheet was cooled to about 50° C., followed by trimming. There was obtained a double-layered unstretched sheet composed of 65 μm thick layer A and 15 μm thick layer D (total thickness: 80 μm).

TABLE 1

| Example No. | Heat-Sealable Resin Mixture | | | Weight Ratio (1)/(2)/(3) (%) | Results of Evaluation | | | | | |
|---|---|---|---|---|---|---|---|---|---|---|
| | Kind (Melting Point; °C.) | | | | Opacity (%) | Blister | | | | |
| | (1) | (2) | (3) | | | 7 sec | 9 sec | 11 sec | 13 sec | 15 sec |
| Example 1 | LLDPE[1] (127) | LDPE[2] (108) | EMA[3] (86) | 30/50/20 | 92 | 25 | 25 | 25 | 25 | 25 |
| Example 2 | LLDPE[1] (127) | LDPE[2] (108) | EMA[3] (86) | 15/70/15 | 92 | 25 | 25 | 25 | 25 | 25 |
| Example 3 | LLDPE[1] (127) | LDPE[2] (108) | EMA[3] (86) | 45/10/45 | 92 | 24 | 25 | 25 | 25 | 25 |
| Example 4 | LLDPE[1] (127) | — | EMA[3] (86) | 45/0/55 | 92 | 23 | 25 | 25 | 25 | 25 |
| Example 5 | LLDPE (127) | LDPE (108) | — | 20/80/0 | 92 | 25 | 25 | 25 | 25 | 25 |
| Compara. Example 1 | — | — | EMA (86) | 0/0/100 | 92 | 7 | 10 | 12 | 18 | 25 |
| Compara. Example 2 | LLDPE (127) | — | — | 100/0/0 | 92 | 5 | 7 | 7 | 7 | 10 |
| Example 6 | HDPE[4] (134) | LDPE (108) | EVA[5] (90) | 30/50/20 | 93 | 24 | 25 | 25 | 25 | 25 |
| Example 7 | LLDPE (127) | EAA[6] (100) | EVA (90) | 30/50/20 | 92 | 25 | 25 | 25 | 25 | 25 |
| Example 8 | LDPE (108) | EVA (90) | EMA (86) | 30/50/20 | 91 | 22 | 25 | 25 | 25 | 25 |
| Compara. Example 3 | PP[7] (167) | LDPE (108) | EMA (86) | 30/50/20 | 93 | 5 | 5 | 7 | 7 | 7 |
| Compara. Example 4 | EAA (100) | EVA (90) | EMA (86) | 30/50/20 | 92 | 10 | 12 | 15 | 20 | 23 |
| Example 9 | LDPE (108) | EAA (100) | EMA (86) | 30/50/20 | 18 | 25 | 25 | 25 | 25 | 25 |

Note:
[1]Linear low-density polyethylene
[2]Low-density polyethylene
[3]Ethylene-methyl acrylate copolymer
[4]High-density polyethylene
[5]Ethylene-vinyl acetate copolymer
[6]Ethylene-acrylic acid copolymer
[7]Polypropylene

EXAMPLES 1 TO 4

A label having a 5-layered structure was prepared in the same manner as in Example 1, except for changing the kinds and proportions of the heat-sealable resins in layer D. A labeled container was produced using the resulting label in the same manner as in Example 1. The results of each evaluation are shown in Table 1, and the

TABLE 2

| | Label Surface Temperature Immediately After Opening Mold | | | | |
|---|---|---|---|---|---|
| | Cooling Time | | | | |
| Example No. | 7 sec | 9 sec | 11 sec | 13 sec | 15 sec |
| Examples 1 to 8 and Comparative | 105° C. to 110° C. | 95° C. to 100° C. | 75° C. to 80° C. | 60° C. to 65° C. | 40° C. to 45° C. |

TABLE 2-continued

| Example No. | Label Surface Temperature Immediately After Opening Mold Cooling Time | | | | |
|---|---|---|---|---|---|
| | 7 sec | 9 sec | 11 sec | 13 sec | 15 sec |
| Examples 1 to 4 | | | | | |
| Example 9 | 100° C. | 90° C. | 70° C. | 55° C. | 35° C. |

The process for producing a labeled hollow container of the present invention is characterized by using a label whose heat-sealable resin layer comprises a mixture of at least two kinds of thermoplastic resins including a lower-melting resin and a higher-melting resin, the mixture having a lower melting point than the resin of the base layer of the label by at least 20° C. According to this process, a container with a label having a satisfactory appearance free from blisters can be produced at low cost even when the molding cycle is shortened.

While the invention has been described in detail and with reference to specific examples, it will be apparent to one skilled in the art that various changes and modifications can be made without departing from the spirit and scope thereof.

We claim:

1. A process for producing a labeled hollow container, which comprises:

inserting a label having a multi-layer structure into a hollow mold and blow molding a molten parison of a thermoplastic polypropylene or high-density polyethylene resin (designated thermoplastic resin C) in the mold, wherein said label is composed of a base layer comprising a thermoplastic polypropylene resin (designated thermoplastic resin A) having on one side thereof a heat-sealable resin layer comprising a mixture of at least two thermoplastic resins (designated lower-melting thermoplastic resin B and higher-melting- thermoplastic resin (B'), wherein said mixture is constituted from 10 to 55% by weight component (B') of a linear low-density polyethylene having a density of from 0.88 to 0.94 g/cm$^3$ and a melt index of from 0.05 to 30 g/10 min and from 45 to 90% by weight of component (B) which is at least one resin selected from the group consisting of low-density polyethylene, an ethylene-methacrylic acid copolymer, an ethylene-acrylic acid copolymer, and an ethylene-vinylacetate copolymer, each of (B') and (B) having a melting point which is at least 20° C. lower than that of said thermoplastic resin A, said mixture of thermoplastic resins B and B' satisfying the relationships:

$$5 < T_{mC} - T_{mB} < 80$$

$$15 < T_{mB'} - T_{mB} < 50$$

wherein $T_{mC}$ is the melting point of thermoplastic resin C constituting the parison; $T_{mB'}$ is the melting point of higher-melting thermoplastic resin B'; and $T_{mB}$ is the melting point of lower-melting thermoplastic resin B, and lower-melting thermoplastic resin B being present in a proportion of from 10 to 60% by weight based on said heat-sealable resin layer.

2. The process of claim 1, wherein said base layer is a stretched laminate film having microvoids composed of a biaxially stretched polypropylene film containing from 5 to 35% by weight of an inorganic fine powder, and having on one or both sides thereof a paper-like layer comprising a uniaxially stretched polypropylene film containing from 8 to 65% by weight of an inorganic powder.

3. The process of claim 2, wherein said stretched laminate film has a void of from 10 to 50% as calculated from equation:

$$\text{Void } (\%) = [(\rho_0 - \rho)/\rho_0] \times 100$$

wherein $\rho_0$ is the density of a film before stretching; and $\rho$ is the density of the film after stretching.

4. The process of claim 1, wherein said label has a thickness of from 30 to 300 μm, with the heat-sealable resin layer thereof having a thickness of from 1 to 30 μm.

5. The process of claim 1, wherein the label is first inserted into a mold with its heat-sealable resin layer facing inside the cavity, a molten parison of a polypropylene or high-density polyethylene extruded from an extruder is introduced into the mold at a temperature of from 170° to 250° C., one end of the parison is clamped, and a compressed gas of from 0.5 to 10 kg/cm$^2$G is introduced into the inside of the parison to expand the parison.

* * * * *